(12) United States Patent
Wells, Jr.

(10) Patent No.: US 12,326,165 B2
(45) Date of Patent: Jun. 10, 2025

(54) SPRING LATCH FOR A HOOK

(71) Applicant: Columbus McKinnon Corporation, Getzville, NY (US)

(72) Inventor: William P. Wells, Jr., Ider, AL (US)

( * ) Notice: Subject to any disclaimer, the term of this patent is extended or adjusted under 35 U.S.C. 154(b) by 0 days.

(21) Appl. No.: 18/269,466

(22) PCT Filed: May 8, 2023

(86) PCT No.: PCT/US2023/021368
§ 371 (c)(1),
(2) Date: Jun. 23, 2023

(87) PCT Pub. No.: WO2023/219954
PCT Pub. Date: Nov. 16, 2023

(65) Prior Publication Data
US 2024/0418207 A1    Dec. 19, 2024

Related U.S. Application Data (60) Provisional application No. 63/339,991, filed on May 10, 2022.

(51) Int. Cl.
*F16B 45/02*    (2006.01)

(52) U.S. Cl.
CPC .................................. *F16B 45/023* (2021.05)

(58) Field of Classification Search
CPC .... F16B 45/023; F16B 45/024; F16B 45/026; F16B 45/02; E05F 1/1207; E05F 1/1215; G02C 5/2218; G02C 5/2227; G02C 2200/28
See application file for complete search history.

(56) References Cited

U.S. PATENT DOCUMENTS 855,362 A * 5/1907 Symington ............. B61F 15/26
384/190.2
1,769,151 A * 7/1930 Mason .................. E05B 83/243
292/114

(Continued)

FOREIGN PATENT DOCUMENTS

CN    2690653 Y    4/2005
CN    2823646 Y    10/2006

(Continued)

OTHER PUBLICATIONS

Written Opinion of the International Search Authority for PCT/US2023/021368 mailed on Aug. 23, 2023.

(Continued)

*Primary Examiner* — Jack W Lavinder (57) ABSTRACT

A spring latch has a pair of spaced apart torsional springs disposed on opposite sides of a hole in a neck portion of a hook. A horizontal elongate member is connected to one of the pair of spaced apart torsional springs and an elongate member is connected to the pair of spaced apart torsional springs. The horizontal elongate member extends through the hole in the neck portion. The elongate member extends to a distal portion. The distal portion is configured to engage with a surface on the hook near a tip such that in a closed position the spring latch blocks the opening formed between the tip and the neck portion of the hook.

20 Claims, 11 Drawing Sheets

(56) References Cited

U.S. PATENT DOCUMENTS

| | | | | | |
|---|---|---|---|---|---|
| 2,967,325 | A | * | 1/1961 | Herzfeld | G02C 5/2218 |
| | | | | | 16/386 |
| 4,440,432 | A | * | 4/1984 | Goris | F16B 45/026 |
| | | | | | 294/82.2 |
| 4,955,651 | A | * | 9/1990 | Barber | F16B 45/026 |
| | | | | | 294/82.19 |

FOREIGN PATENT DOCUMENTS

| | | | |
|---|---|---|---|
| CN | 209943265 U | | 1/2020 |
| JP | S6094566 U | * | 6/1985 |
| JP | 2004138141 A | | 5/2004 |
| JP | 2014001578 A | | 1/2014 |
| TW | 211820 U | | 8/1993 |

OTHER PUBLICATIONS

Torsion Springs, Jan. 22, 2019, Precision Coil Spring.
SS Double Torsion Spring, for Garage, SVBA Industries.

* cited by examiner

SPRING LATCH FOR A HOOK

CROSS-REFERENCE TO RELATED APPLICATION

The present application claims priority benefit from U.S. Provisional Patent Application No. 63/339,991 filed on May 10, 2022, and entitled "Spring Latch for a Hook," which is incorporated herein by reference.

TECHNICAL FIELD

The present invention relates generally to the field of hoists and rigging equipment, and more particularly to a hook assembly including a safety latch.

BACKGROUND ART

The Occupation Health and Safety Administration ("OSHA") and the American Society of Mechanical Engineers ("ASME") require latches to be on hooks used in material handling applications such as hooks used with cranes and hoists. Latches are frequently damaged in the field. There is a need for an improved design that is advantageous for manufacturing and for end users.

BRIEF SUMMARY OF THE INVENTION

The present invention meets the above described need. With parenthetical reference to the corresponding parts, portions or surfaces of the disclosed embodiment, merely for the purposes of illustration and not by way of limitation, in one embodiment the present invention provides a hook assembly (100). The hook assembly (100) comprises a hook (110) having a body portion (113) with a first end (116) and a second end (119). The body portion (113) extends along a curve to a tip (143) disposed at the second end (119). The body portion (113) has a neck portion (131) disposed in spaced apart relation to the tip (143) such that an opening (146) is formed between the tip (143) and the neck portion (131). The neck portion (131) has a hole (163) extending therethrough.

A spring latch (9) has a pair of spaced apart torsional springs (10, 13) disposed on opposite sides of the hole (163) in the neck portion (131). A horizontal elongate member (22) is connected to one of the pair of spaced apart torsional springs (10, 13) and an elongate member (21) is connected to the pair of spaced apart torsional springs (10, 13). The elongate member (21) extends to a distal portion (23). The distal portion (23) is configured to engage with an obstruction (170) on the hook (110) near the tip (143) such that in a closed position the spring latch (9) blocks the opening (146) formed between the tip (143) and the neck portion (131) of the hook (110).

The spring latch (9) also includes a lateral member (19) connected to one of the pair of spaced apart torsional springs (10, 13). The lateral member (19) extends across the neck portion (131) below the hole (163).

When the spring latch (9) is installed on the hook (110), the horizontal elongate member (22) extends through the opening (163) in the neck portion (131) and the spring latch (9) is spring biased in the closed position by the pair of torsional springs (10, 13).

In one aspect of the invention, the lateral member (19) has an end portion (16) that extends upward into a position inside the other of the pair of spaced apart torsional springs (10).

In another aspect of the invention, the distal portion (23) of the elongate member (21) has one or more curved sections (30, 33, 36) forming a tip lock (25).

In yet another aspect of the invention, the hook (110) has a recessed portion (150) near the tip (143) forming a shoulder configured to engage with the distal portion (23) of the elongate member (21).

Another aspect of the invention is that the elongate member (21) extends from an inner portion of each spring coil (10, 13).

In another aspect, the elongate member (21) extends from an outer portion of each spring coil (10, 13).

In yet another aspect of the invention, a hook connection is selected from the group consisting of a clevis, eye, shank, and knob.

Another aspect of the invention is that the torsional spring (10, 13) comprises a helical coil.

In another aspect of the invention, the neck portion (131) has a recessed portion (139) configured to receive a portion of the torsional springs (10, 13).

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly"

generally refer to the orientation of a surface relative to its axis of elongation, or of rotation, as appropriate.

Figure 1:
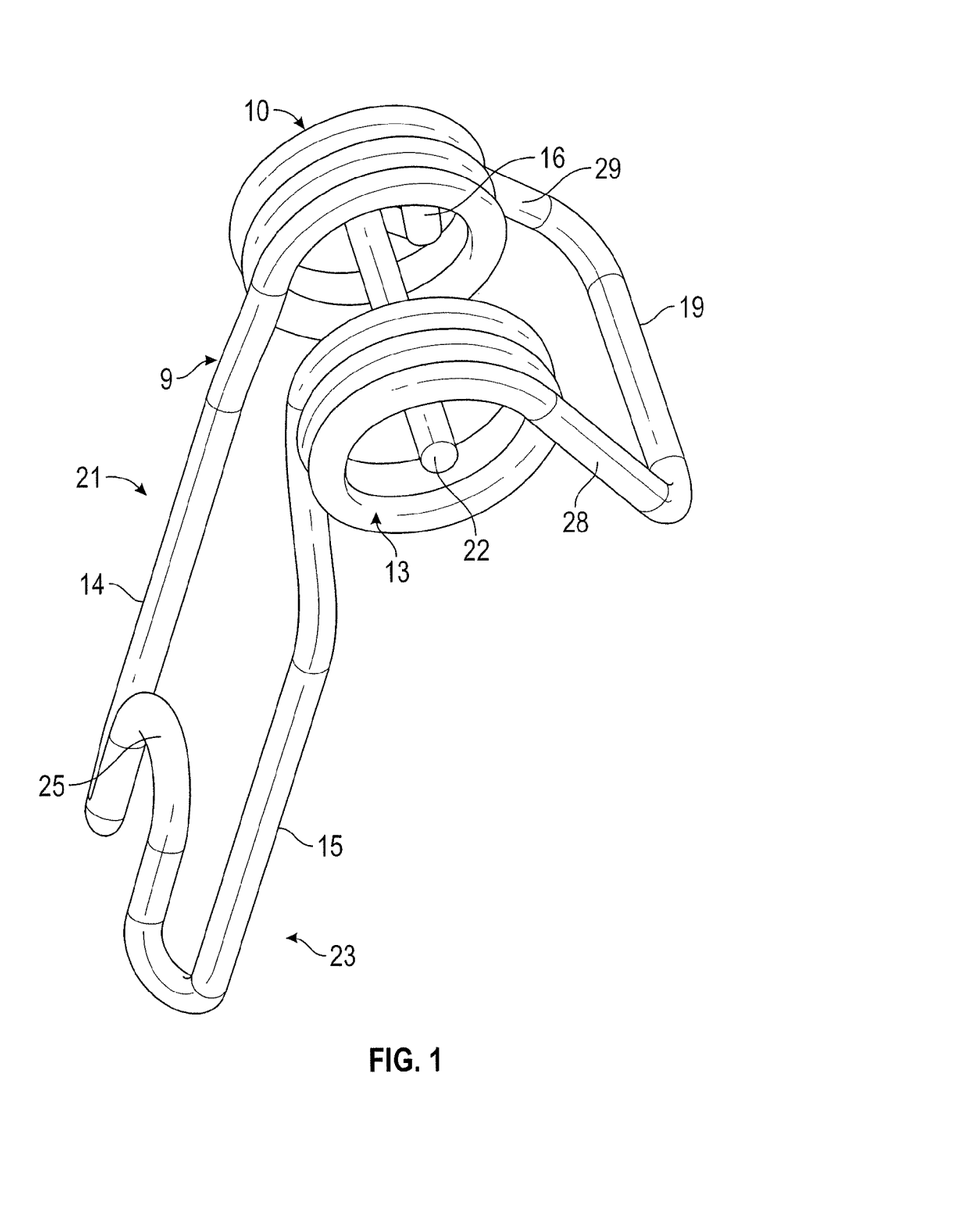
FIG. 1 is a perspective view of one embodiment of the spring latch of the present invention.

Referring generally to FIGS. 1-11, and initially to FIG. 1 thereof, a spring latch 9 may be formed as a single uniquely bent spring. The spring latch 9 may be constructed of a suitable metal or other resilient material with spring-like properties. The spring latch 9 may replace a typical latch assembly formed from several components including, but not limited to, a latch, a spring, a screw and a nut. The spring latch 9 may be formed as a torsional spring with a pair of spaced apart torsional spring coils including a first torsional coil 10 and a second torsional coil 13. A torsional spring is formed by a metal or wire in the shape of a helix (coil) that is subject to twisting about the axis of the coil by forces applied to its ends. The spring latch 9 may be assembled to a hook with or without tools. By way of example, the spring latch 9 may be constructed to be elastic and resilient such that the coils 10 and 13 may be placed against the hook 110 on opposite sides of central portion 160. The coil 13 can then be pulled outward to spread apart the coils 10, 13 until the elongate horizontal member 22 can be inserted into opening 163. Next, the last bend 16 of the second coil 13 may be placed over the first coil 10 to form an interlock between the coils 10, 13.

Figure 2:
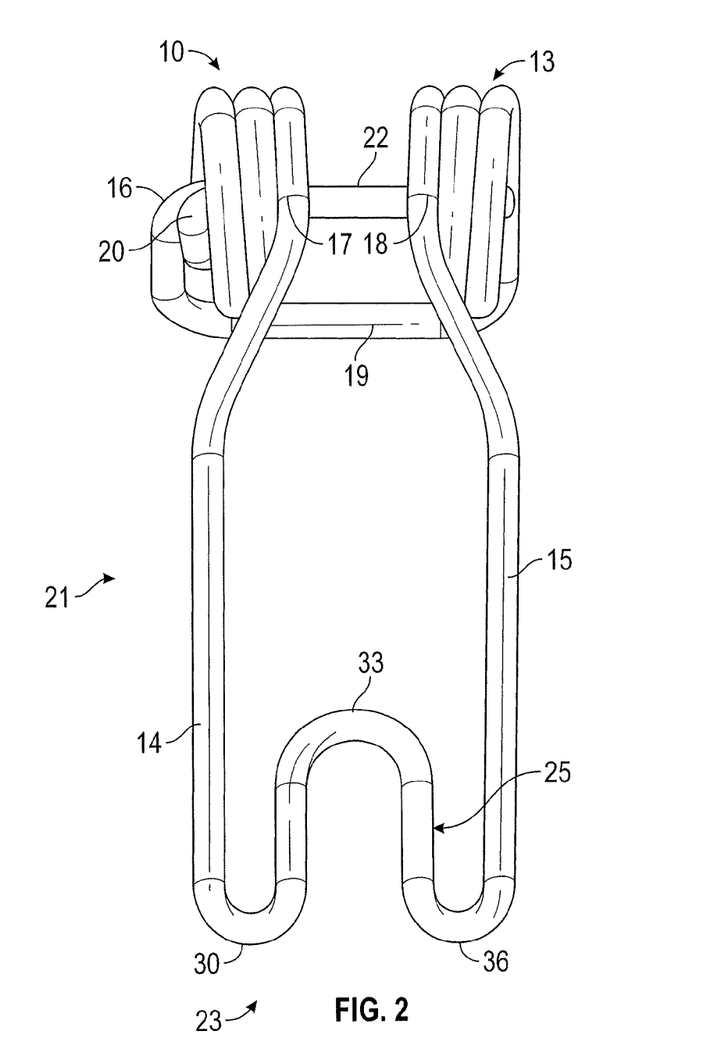
FIG. 2 is a front elevational view of the spring latch of FIG. 1.
Figure 3:
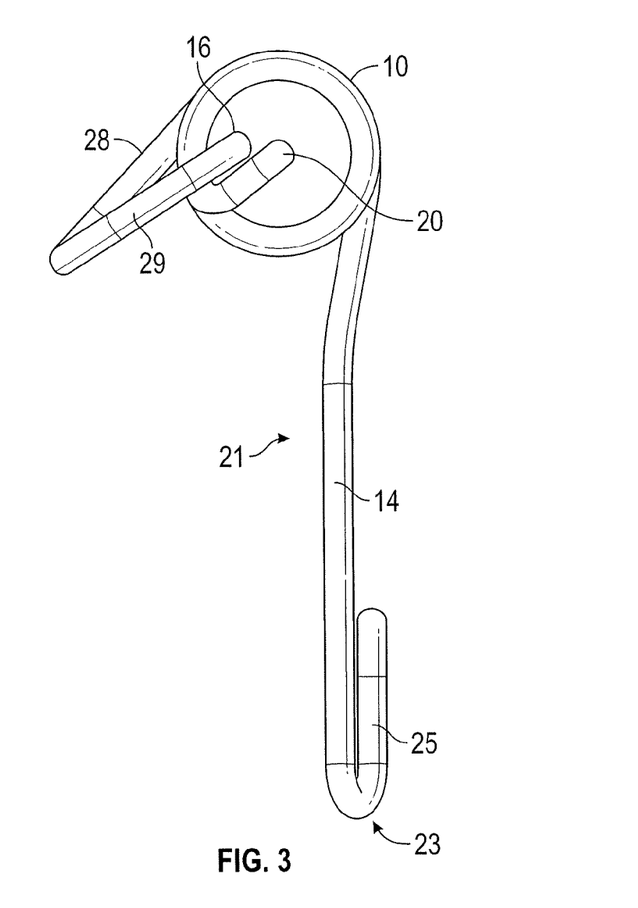
FIG. 3 is a side elevational view of the spring latch of FIG. 1.
Figure 11:
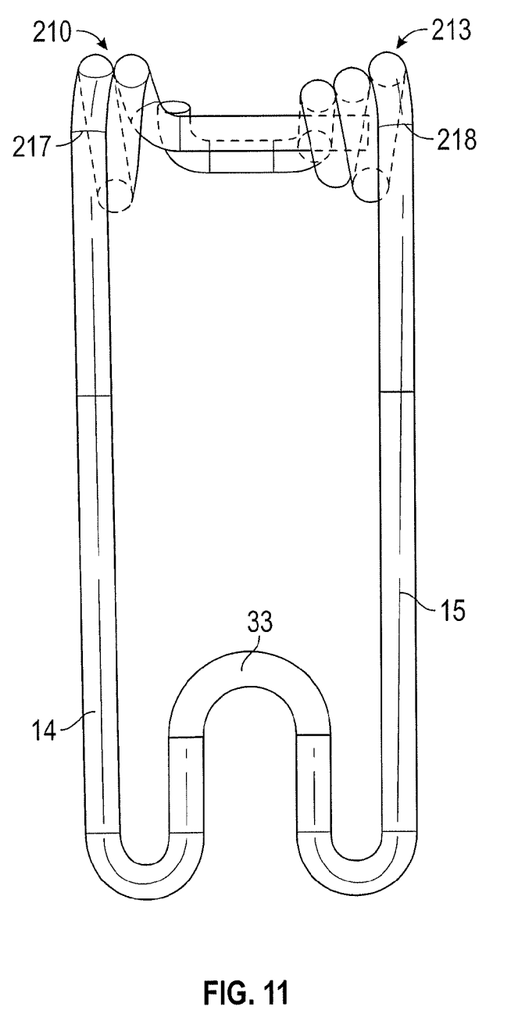
FIG. 11 is a front elevational view of an alternate embodiment of the spring latch of FIG. 1.

As shown in FIG. 2 the inner ends 17, 18 of each coil 10 and 13 may extend continuously outward from the center at an angle and then form straight, substantially parallel elongate bars 14, 15 that extend away from the respective coils 10, 13 in spaced apart relation. Alternatively, as shown in FIG. 11, the elongate bars 14, 15 may be configured to extend from outer ends 217, 218 of coils 210 and 213. The elongate bars 14, 15 form an elongate member 21 extending to a distal portion 23.

Each coil 10 and 13 may be provided with several successive turns forming helixes extending outward to the left and right with respect to FIG. 2 from the inner ends 17, 18. The final turn of the first coil 10 stops along its arc and then makes an approximately 90 degree bend 20 and then extends along a first straight horizontal elongate member 22 (best shown in FIG. 1). The final turn of the second coil 13 may extend downward at an angle in a first section 28 and then horizontally along a lateral member 19 (best shown in FIG. 1). From the end of the lateral member 19, the spring may extend upward at an angle in a second section 29 and then turns inward in the last bend 16 to lock over the first coil 10 (best shown in FIG. 3).

As best shown in FIG. 2, the elongate portions 14 and 15 of the spring 9 may extend at the end opposite from the coils 10 and 13 to a tip lock 25 that may be formed in the shape of several curved sections 30, 33, and 36. The tip lock 25 forms the end of the spring latch 9 which is held in position on the hook 110 (described below) and is capable of rotating inward when a cable or wire is attached to the hook 110.

Figure 4:
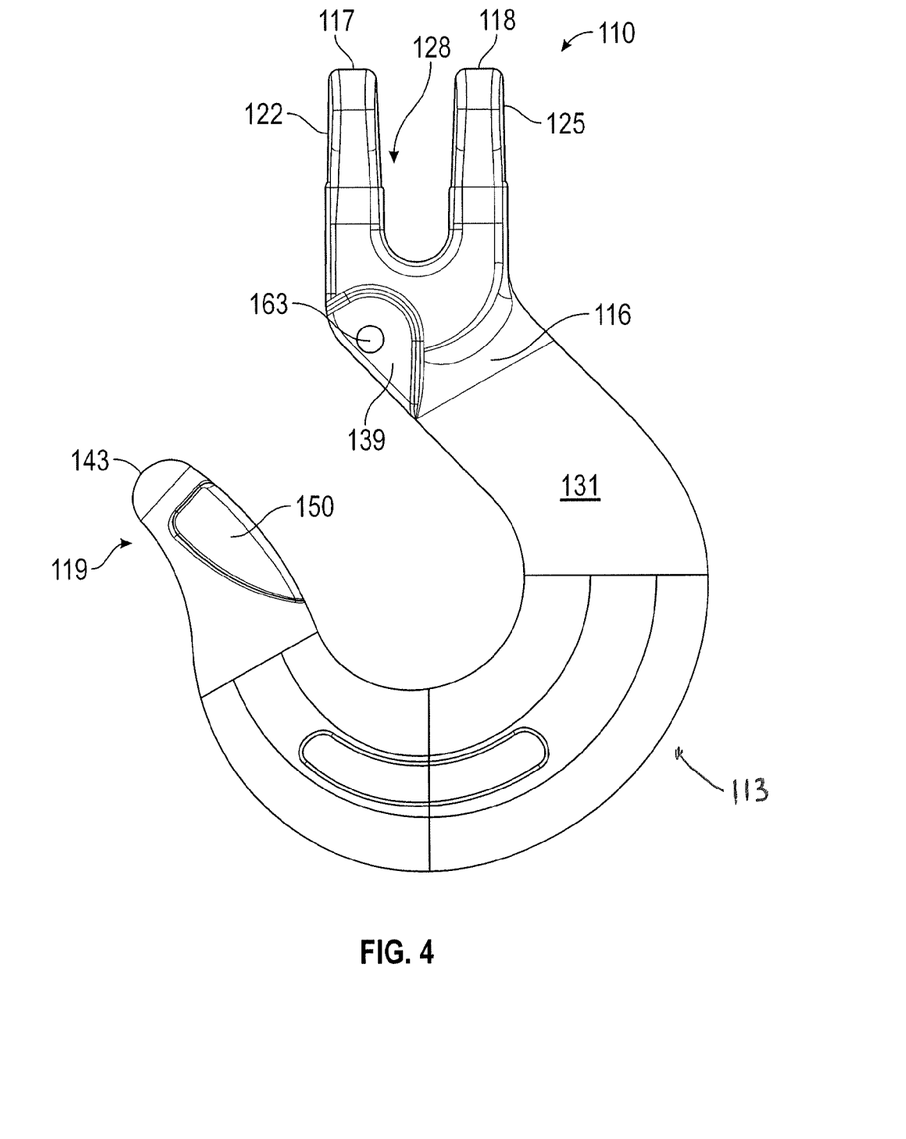
FIG. 4 is a side elevational view of one embodiment of a hook for use with the present invention.

Turning to FIG. 4, one embodiment of the invention includes a hook 110 having a body portion 113 with a first end 116 and a second end 119. The hook 110 may be formed of a high strength material such as steel or the like for use in industrial applications for connecting a load to a crane, hoist or the like. In one example, the first end 116 may be provided with a pair of spaced apart, opposed members 117 and 118 that terminate at the first end 116 of the body 113. The opposed members 117 and 118 may be configured in facing relation and may be provided with openings 122 and 125 defined therein. The openings 122, 125 receive a pin (not shown) for connecting the hook 110 to a chain, wire rope, or cable as described below. The opposed members 117 and 118 form a U-shaped opening 128 therebetween.

Figure 7:
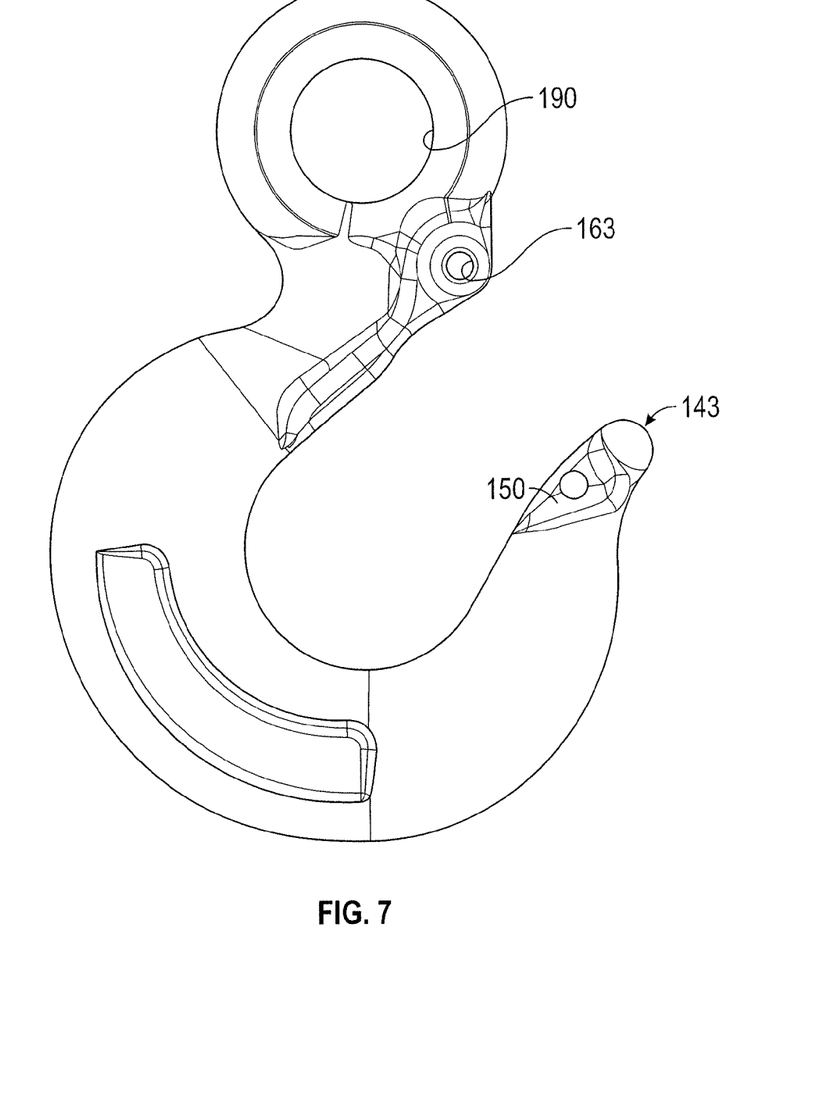
FIG. 7 is a side elevational view of an alternate embodiment of the hook.
Figure 8:
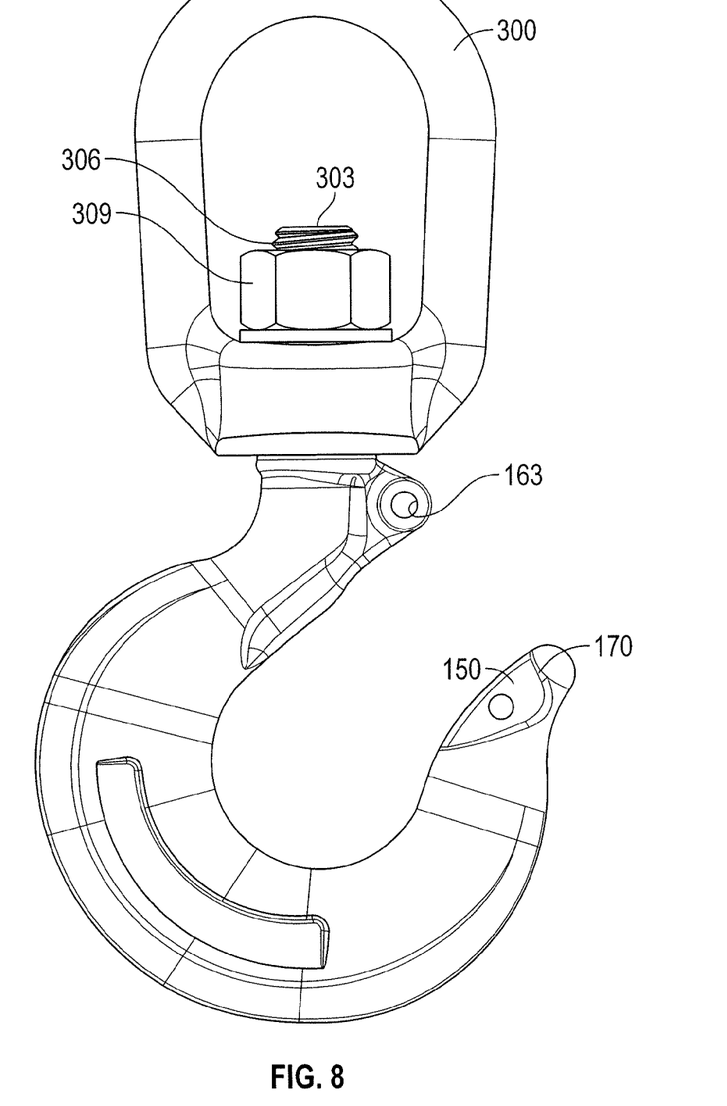
FIG. 8 is side elevational view of an alternate embodiment of the hook
Figure 9:
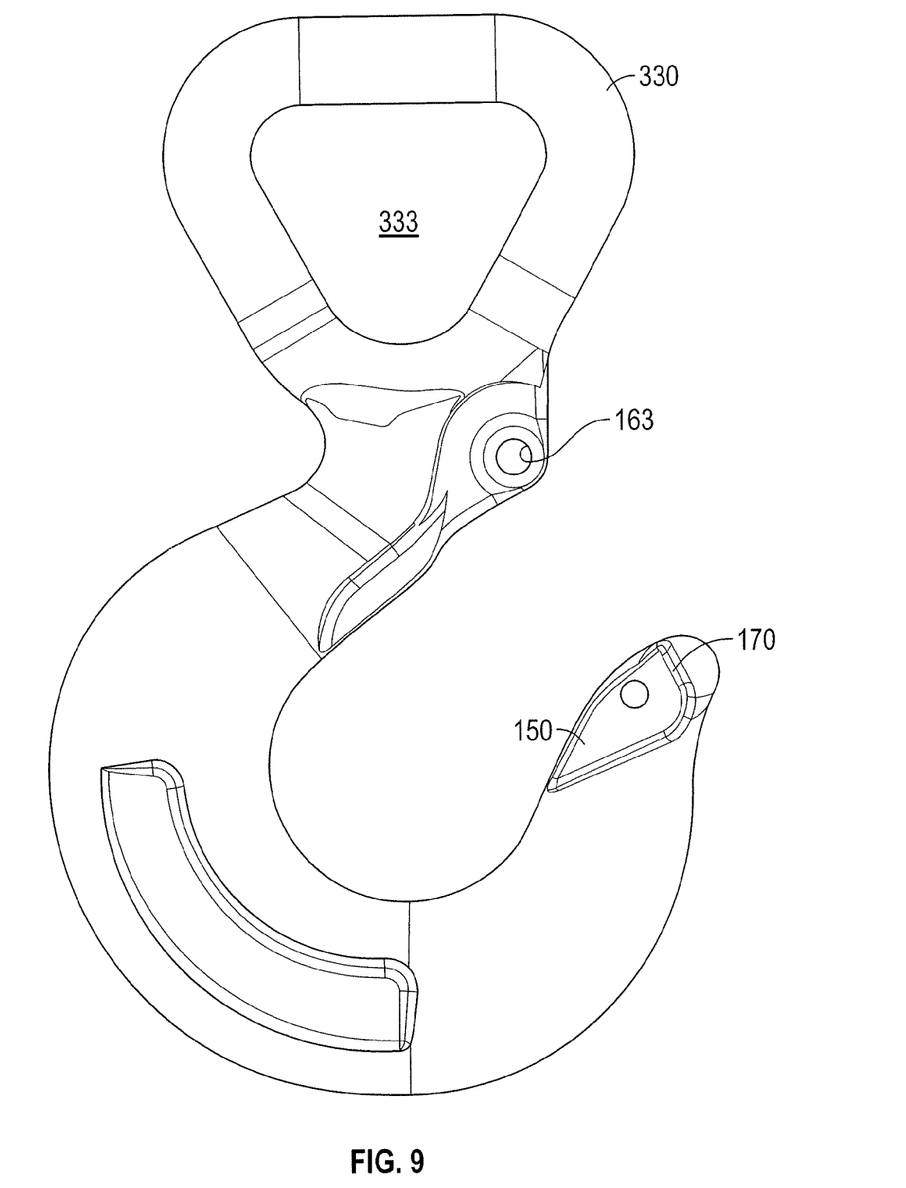
FIG. 9 is side elevational view of another alternate embodiment of the hook.
Figure 10:
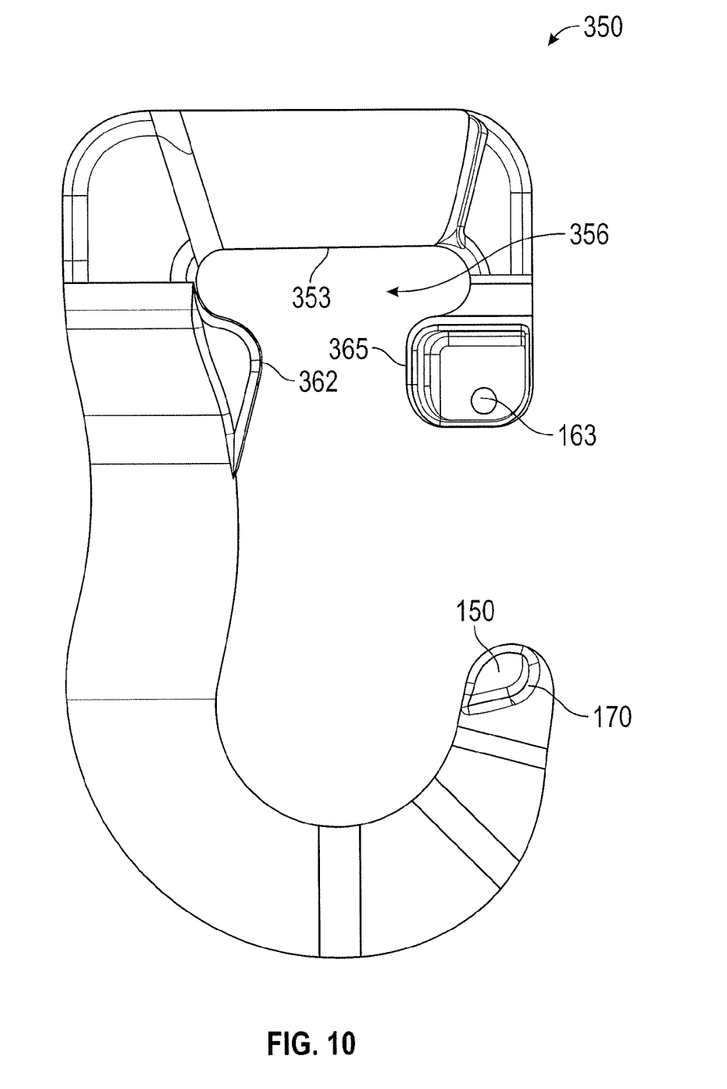
FIG. 10 is a side elevational view of another alternate embodiment of the hook.

The opposed members 117 and 118 are configured in this manner for attaching the hook 110 to a chain, wire rope, or cable attached to a crane or hoist. The opposed members 117 and 118 extend upward from a neck portion 131 of the body 113. Alternatively, as shown in FIG. 7 the top of the hook 110 may be provided with a single eye 190 instead of opposed members 117 and 118. As shown in FIGS. 8-10 and as will be evident to persons of ordinary skill in the art based on this disclosure, this invention may be used with any type of hook connection including but not limited to eyes, shanks, knobs, or connections for synthetic slings. In FIG. 8, a bail eye nut 300 may be mounted on the hook's shank 303 having threads 306 disposed thereon for engaging with a nut 309. In FIG. 9 a hook connection 330 has a generally triangular shaped opening 333. In FIG. 10, a hook connection 350 is configured to receive a sling against a wide flat surface 353 bordering an opening 356 in an area formed beyond opposing surfaces 362 and 365. Accordingly, the latch construction of the present invention may be used with any type of hook connection.

Figure 5:
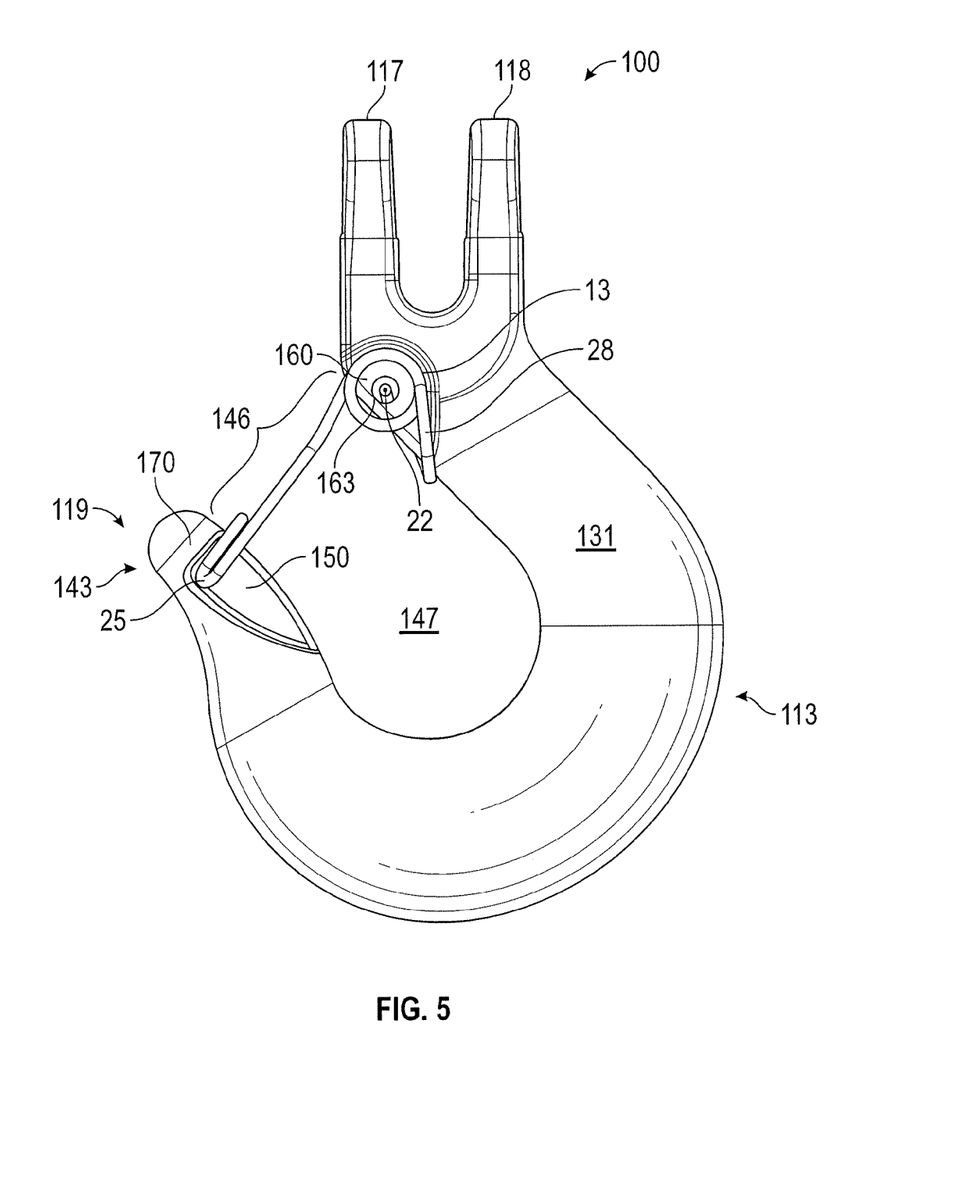
FIG. 5 is side elevational view of the hook assembly of the present invention.
Figure 6:
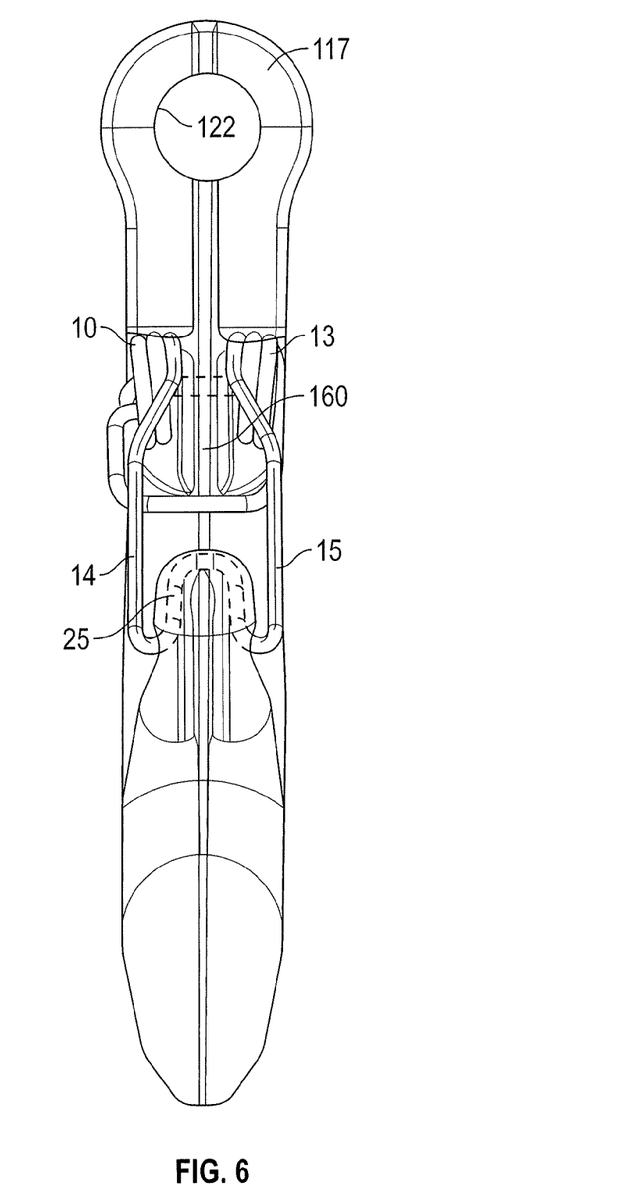
FIG. 6 is a front elevational view of the hook assembly shown in FIG. 5.

Returning to FIG. 5, a hook assembly 100 includes the neck portion 131 that may be provided with a central portion 160 (best shown in FIGS. 5 and 6) with an opening 163 for receiving the first straight horizontal elongate member 22. When the spring latch 9 is installed the coils 10 and 13 are disposed on opposite sides of the central portion 160 and the horizontal elongate member 22 extends through the opening 163 (FIGS. 5 and 6). Accordingly, the horizontal elongate member 22 pivotally attaches the spring latch 9 to the central portion 160 in the neck portion 131. The body 113 extends along a curve until it reaches the second end 119. The second end 119 terminates in a tip 143. An opening 146 is formed between the tip 143 and the neck portion 131. The opening 146 leads to a U-shaped space 147 defined by the body 113 of the hook 110.

The second end 119 may be provided with a recessed portion 150 for receiving the tip lock 25 which is spring biased in the clockwise direction with respect to FIG. 5. The recessed portion 150 terminates at the tip 143 where an obstruction 170 (FIG. 7) blocks the tip lock 25 from rotating outward past the tip 143 of the hook 110. From the position shown in FIG. 5, the spring latch 9 can only rotate inward in the counter clockwise direction to allow the hook 110 to receive a wire rope or cable. Alternatively, the tip lock 25 may rotate into engagement with another surface of the hook.

The present invention contemplates that many changes and modifications may be made. Therefore, while the presently-preferred form of the spring latch for a hook has been shown and described, and several modifications and alternatives discussed, persons skilled in this art will readily appreciate that various additional changes and modifications may be made without departing from the spirit of the invention.

What is claimed is:

1. A hook assembly, comprising:
a hook having a body portion with a first end and a second end, the body portion extending along a curve to a tip disposed at the second end, the body having a neck disposed is spaced apart relation to the tip such that an opening is formed between the tip and the neck portion, the neck portion having a hole extending therethrough;
a spring latch having a pair of spaced apart torsional springs disposed on opposite sides of the hole in the neck portion, a horizontal elongate member connected to one of the pair of spaced apart torsional springs and an elongate member connected to the pair of spaced apart torsional springs, the elongate member extending to a distal portion, the distal portion configured to engage with the hook such that in a closed position the spring latch blocks the opening formed between the tip and the neck portion of the hook;

wherein the spring latch further comprises a lateral member connected to one of the pair of spaced apart torsional springs, the lateral member extending across the neck portion below the hole;

wherein when the spring latch is installed on the hook the horizontal elongate member extends through the hole in the neck portion and the spring latch is spring biased in the closed position by the pair of torsional springs.

2. The hook assembly of claim 1, wherein the lateral member has an end portion that extends upward into a position inside the other of the pair of spaced apart torsional springs.

3. The hook assembly of claim 1, wherein the distal portion engages with an obstruction on the hook near the tip.

4. The hook assembly of claim 1, wherein the distal portion of the elongate member has one or more curved sections forming a tip lock.

5. The hook assembly of claim 1, wherein the hook has a recessed portion near the tip forming a shoulder configured to engage with the distal portion of the elongate member.

6. The hook assembly of claim 1, wherein the elongate member extends from an inner portion of each one of the pair of spaced apart torsional springs.

7. The hook assembly of claim 1, wherein the elongate member extends from an outer portion of each one of the pair of spaced apart torsional springs.

8. The hook assembly of claim 1, wherein a hook connection is selected from the group consisting of a clevis, eye, shank, and knob.

9. The hook assembly of claim 1, wherein each one of the pair of spaced apart torsional springs comprises a helical coil.

10. The hook assembly of claim 1, wherein the neck portion has a recessed portion configured to receive a portion of each one of the pair of spaced apart torsional springs.

11. A spring latch for use with a hook, the hook having a body portion with a first end and a second end, the body portion extending along a curve to a tip disposed at the second end, the body having a neck disposed is spaced apart relation to the tip such that an opening is formed between the tip and the neck portion, the neck portion having a hole extending therethrough, the spring latch comprising:
a pair of spaced apart torsional springs disposed on opposite sides of the hole in the neck portion, a horizontal elongate member connected to one of the pair of spaced apart torsional springs and an elongate member connected to the pair of spaced apart torsional springs, the elongate member extending to a distal portion, the distal portion configured to engage with the hook such that in a closed position the spring latch blocks the opening formed between the tip and the neck portion of the hook;

wherein the spring latch further comprises a lateral member connected to one of the pair of spaced apart torsional springs, the lateral member extending across the neck portion below the hole;

wherein when the spring latch is installed on the hook the horizontal elongate member extends through the hole in the neck portion and the spring latch is spring biased in the closed position by the pair of torsional springs.

12. The spring latch of claim 11, wherein the lateral member has an end portion that extends upward into a position inside the other of the pair of spaced apart torsional springs.

13. The spring latch of claim 11, wherein the distal portion of the elongate member has one or more curved sections forming a tip lock.

14. The spring latch of claim 11, wherein the elongate member extends from an inner portion of each one of the pair of spaced apart torsional springs.

15. The spring latch of claim 11, wherein the elongate member extends from an outer portion of each one of the pair of spaced apart torsional springs.

16. The spring latch of claim 11, wherein each one of the pair of spaced apart torsional springs comprises a helical coil.

17. A hook assembly, comprising:
a hook having a body portion with a first end and a second end, the body portion extending along a curve to a tip disposed at the second end, the body having a neck disposed is spaced apart relation to the tip such that an opening is formed between the tip and the neck portion, the neck portion having a hole extending therethrough;
a spring latch having a pair of spaced apart torsional springs disposed on opposite sides of the hole in the neck portion, a horizontal elongate member connected to one of the pair of spaced apart torsional springs and an elongate member connected to the pair of spaced apart torsional springs, the elongate member extending to a distal portion, the distal portion configured to engage with the hook such that in a closed position the spring latch blocks the opening formed between the tip and the neck portion of the hook;
wherein the spring latch further comprises a lateral member connected to one of the pair of spaced apart torsional springs, the lateral member extending across the neck portion below the hole, the lateral member has an end portion that extends upward into a position inside the other of the pair of spaced apart torsional springs;
wherein when the spring latch is installed on the hook the horizontal elongate member extends through the hole in the neck portion and the spring latch is spring biased in the closed position by the pair of torsional springs; and,
wherein the hook has a recessed portion near the tip forming a shoulder configured to engage with the distal portion of the elongate member.

18. The spring latch of claim 17, wherein the distal portion of the elongate member has one or more curved sections forming a tip lock.

19. The spring latch of claim 17, wherein the elongate member extends from an inner portion of each one of the pair of spaced apart torsional springs.

20. The spring latch of claim 17, wherein the elongate member extends from an outer portion of each one of the pair of spaced apart torsional springs.

* * * * *